G. RENNERFELT.
THRUST BEARING.
APPLICATION FILED OCT. 19, 1908.
941,097.
Patented Nov. 23, 1909.
2 SHEETS—SHEET 1.
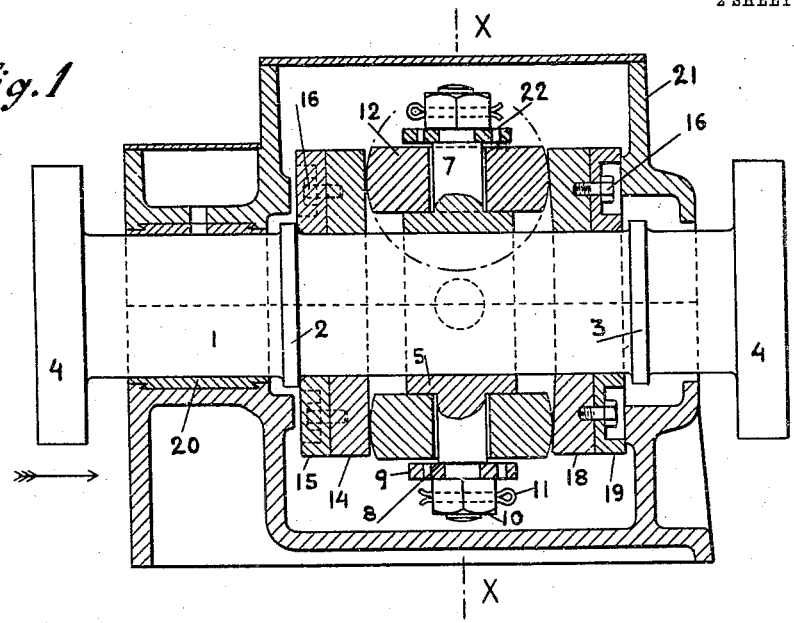
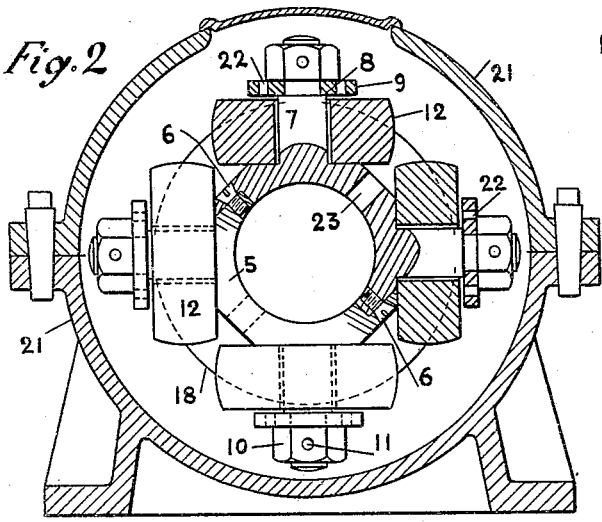
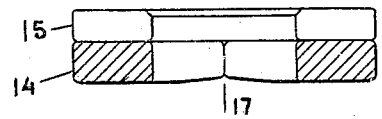
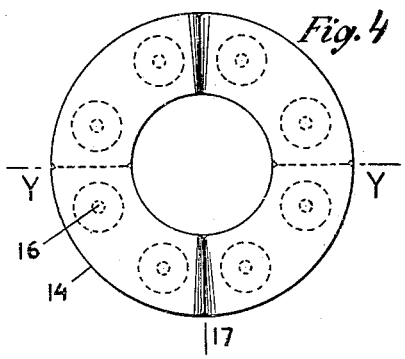
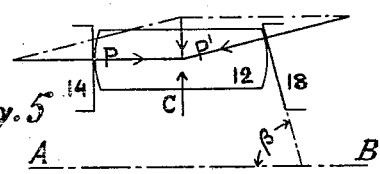
WITNESSES
Chas. O. Pearson
G. A. Klinek
INVENTOR
Gustaf Rennerfelt

G. RENNERFELT.
THRUST BEARING.
APPLICATION FILED OCT. 19, 1908.

941,097.

Patented Nov. 23, 1909.
2 SHEETS—SHEET 2.

WITNESSES
Chas. O. Pearson
G. A. Klimek

INVENTOR
Gustaf Rennerfelt

UNITED STATES PATENT OFFICE.

GUSTAF RENNERFELT, OF NEW YORK, N. Y.

THRUST-BEARING.

941,097.  Specification of Letters Patent.  Patented Nov. 23, 1909.

Application filed October 19, 1908.  Serial No. 458,404.

*To all whom it may concern:*

Be it known that I, GUSTAF RENNERFELT, a subject of the King of Sweden, and a resident of the city of New York, in the county of New York and State of New York, have invented certain new and useful Improvements in Thrust-Bearings, of which the following is a specification.

My invention relates to improvements in thrust bearings, and its object is to provide a bearing of this class which is efficient and reliable in its operation and simple and cheap in its construction.

I will describe my invention in the following specification, and point out the novel features thereof in claims.

Figure 6:
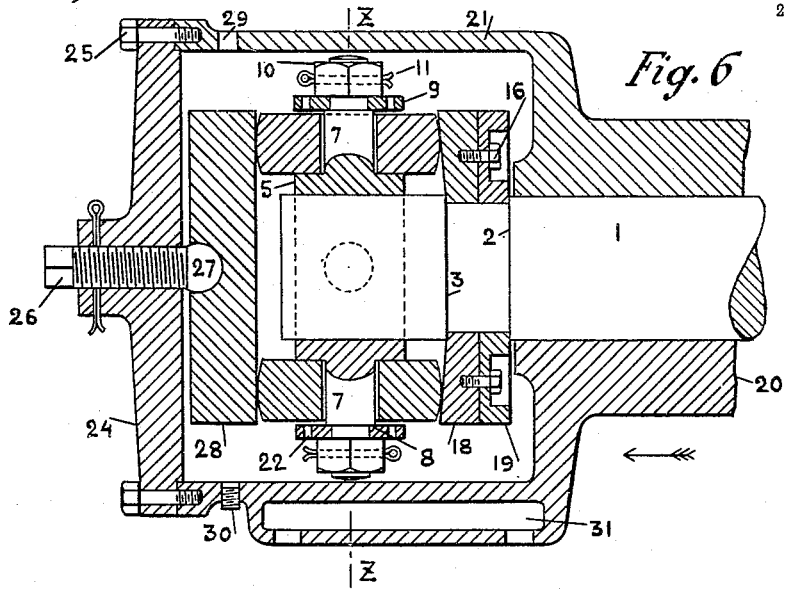
Figure 7:
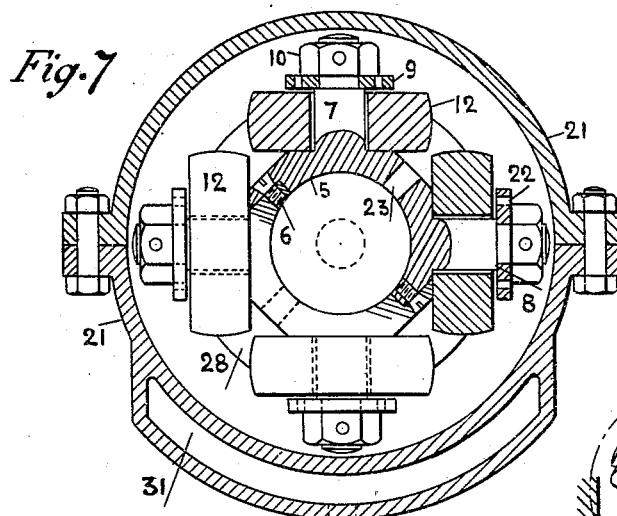
Figure 8:
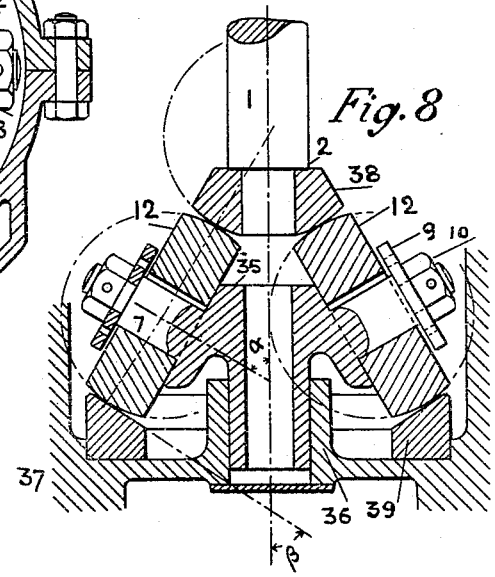

Referring to the drawings, Figure 1 is a sectional side elevation of a thrust bearing constructed according to my invention and arranged for sustaining endthrust in both directions. Fig. 2 is a sectional end elevation of the thrust bearing shown in Fig. 1, the section being taken through the line $x$—$x$ of Fig. 1 and viewed in the direction of the arrow. Fig. 3 is a sectional view of a detail of the bearing, the section being taken on line Y—Y of Fig. 4. Fig. 4 is an end view of said detail. Fig. 5 is a diagrammatic view illustrating the forces acting on a detail, called the roller of the bearing. Fig. 6 is a sectional side elevation of a bearing constructed according to my invention, and arranged for sustaining endthrust in one single direction. Fig. 7 is a sectional end-elevation of the bearing shown in Fig. 6, the section being taken through the line Z—Z of Fig. 6, and viewed in the direction of the arrow. Fig. 8 is a sectional side elevation of a modification of the bearing, arranged to be self-alining and to sustain both endthrust and lateral pressure from a shaft.

Like characters of reference designate corresponding parts in all of the figures.

1 designates a shaft to which my bearing is applied, 2 and 3 designate shoulders on the shaft, and 4, 4 designate flanges constructed integrally with the shaft and to which couplings may be connected for transmitting power to and from the shaft.

5 designates a hub constructed in two halves fastened together by bolts 6, 6 and mounted loosely on the shaft between the shoulders 2 and 3. Four cylindrical studs 7 extend from the hub; each stud is provided with a shoulder 8 against which is clamped a washer 9 by means of a nut 10 securely fastened to the end of the stud by means of its screwthreads and a split pin 11.

Upon each stud between the hub and the washer 9 is mounted a roller 12 having flat ends and a spherical face constituting the middle section of a sphere and consequently having a diameter greater than its length. The hole in the center of the roller is appreciably larger than the diameter of the stud 7, and the distance between the side of the hub 5 and the washer 9 is greater than the length of the roller. 14 designates a hardened steel disk serving as a track for the rollers and constructed in two semicircular halves, and 15 designates a plate of steel or other suitable material also formed in two semicircular halves. Said disk 14 and plate 15 are fastened together by means of bolts 16; the abutting edges 17 of the halves of the disk 14 are beveled or rounded, and the joints in disk 14 overlap the joints in plate 15 by 90° as clearly shown in Fig. 4. The face of the disk 14 is flat. 18 and 19 designate respectively another steel disk serving as a track and a plate constructed similarly to the disk 14 and plate 15 with the exception that the face of the disk 18 is beveled.

20 designates a radial bearing for supporting the shaft, and 21 is a casing formed integrally with the bearing 20, surrounding the rollers and the disks, and arranged to contain a quantity of oil. The washer 9 is perforated with holes 22 for admitting oil between the washer and the end of a roller. The hub 5 is provided with oilholes 23 for admitting oil between the shaft and the hub.

The bearing illustrated in Figs. 1 and 2 is suitable for a propeller shaft on which the endthrust may be in either direction. Such shafts are usually made with the flanges 4 formed integrally with the shaft, and for this reason the parts of the bearing which encircle the shaft are constructed in halves so that they may be readily assembled thereon. The face of the disk 18 is beveled in order that the centrifugal force acting on a roller may be balanced. This is clearly illustrated in the diagram Fig. 5 where C indicates the centrifugal force on a roller due to its rotation around the axis A—B of the shaft, and P, P' indicate the pressures on the roller from the disks 14 and 18. The resultant of the pressures P and P' will balance the force C if the angle $\beta$ of the bevel of the disk 18 is such that $\tan \beta = \frac{P}{C}$. The abutting edges of the split steel disks are beveled or rounded in order that they shall be relieved from pressure by the rollers, and all danger be obviated of chips breaking off from said edges. At such moment when two of the rollers are near to the split in the steel disks the whole thrust from the shaft is therefore sustained by the other two rollers solely. At all other moments the said thrust may be more or less evenly distributed on all four of the rollers.

The bearing illustrated in Figs. 6 and 7 is suitable for a centrifugal pump having a horizontal shaft, the endthrust resulting from the operation of the pump being transmitted in the direction of the arrow through the disks and rollers to the cap 24 secured by bolts 25 to the casing 21. A stud 26 is fastened in the cap and projects with a semispherical head 27 inside of the casing. The hardened steel disk 28 is provided in its center with a semispherical recess by means of which it is pivotally mounted on the head 27. The steel disk 28 being thus suspended within the casing will adjust its position so as to equalize the pressure on the different rollers.

29 is a hole for pouring oil into the casing, and 30 is a hole for withdrawing the oil.

31 designates a chamber formed integrally with the casing and arranged to receive cooling water for cooling the oil.

The modified form of bearing illustrated in Fig. 8 is suitable for the vertical shaft of a turbine. The hub 35 is mounted in a bearing 36 formed in the casing 37. The studs 7 which are preferably three in number project from the hub at an angle $a$ which is smaller than 90°, and a spherical roller 12 is mounted on each stud between the hub and the washer 9 clamped to the end of the stud. The hardened steel disk 38 mounted on the shaft 1 is either beveled or spherical, the latter form being preferred since it will make the shaft self-alining. The track 39 is beveled to an angle $\beta$ which is preferably smaller than the angle $a$, and which may be given such a value that the centrifugal force acting on a roller will be balanced in the same manner as described in connection with Fig. 5. In this form of bearing, as well as in the forms previously described, the rollers 12 are mounted with appreciable clearance axially and radially on the studs 7, so that no part of the heavy thrust on the bearing can fall upon the studs, and so that the spherical rollers, while prevented from undue deviation by the washers and by the hub, may still have a certain free motion in relation to the hub insuring a greater number of points for contact with the disks.

In the form of bearing shown in Fig. 6 a distribution of the endthrust on at least three rollers may be effected, even if the workmanship of the bearing is slightly inaccurate. In other forms of my improved bearings I prefer for the sake of safety to make the rollers so large in diameter that each one of the rollers can sustain without being overloaded the entire thrust on the bearing. Flat spherical rollers of the type described can be produced of any large diameter required, at much lower cost than balls of the same diameter, and they will occupy less space in the bearing and be considerably lighter.

What I claim is:

1. In a thrust bearing the combination of a hub, a plurality of studs extending from the hub, a roller having a spherical face mounted on each stud, and two disks in contact with the faces of the roller, one of said disks being beveled.

2. In a thrust bearing the combination of a hub, four studs extending from the hub, a roller mounted on each stud, a disk in contact with the faces of the rollers, another disk in contact with the faces of the rollers, and a plate, said latter disk and said plate being formed in halves bolted together with overlapping joints.

3. In a thrust bearing the combination of a hub, a plurality of studs extending from the hub, a roller mounted on each stud, two disks in contact with the rollers, and a plate, one of said disks and the plate being formed in halves bolted together with overlapping joints, and the abutting edges of the halves of said disk being rounded so as to relieve them from pressure by the rollers.

4. In a thrust bearing the combination of a shaft, a hub mounted thereon, said hub having a hole in its side for admitting oil, a plurality of studs extending from the hub, a roller having a spherical face mounted on each stud, two disks in contact with the faces of the rollers, and a casing arranged to contain oil surrounding the rollers and the disks.

5. In a thrust bearing the combination of a hub, a plurality of studs extending from the hub, a washer fastened to the end of each stud, a roller mounted on each stud between the hub and the washer, two disks in contact with the faces of the rollers, and a casing arranged to contain oil surrounding the rollers and the disks, the washers being perforated for admitting oil between the rollers and the washers.

6. In a thrust bearing the combination of a hub, a plurality of studs extending from the hub, a washer fastened to the end of each stud, a spherical roller mounted with appreciable clearance on each stud between the hub and the washer, two disks in contact with the faces of the rollers, a casing arranged to contain oil surrounding the rollers and the disks, the casing having a chamber arranged therein to receive water for cooling the oil.

7. In a thrust bearing the combination of two disks, a plurality of spherical rollers interposed between the disks, one of said disks having a semispherical recess, a casing arranged to surround the rollers and the disks, and a stud projecting from the end of the casing, said stud having a semispherical head arranged to fit in the recess.

8. In a thrust bearing the combination of a casing, a horizontal shaft extending into the casing, a disk suspended in the casing and mounted pivotally therein, a disk mounted on the shaft, and a plurality of rollers mounted between the disks.

9. In a thrust bearing the combination of a casing, a shaft extending into the casing, a stud having a semispherical head projecting from the end of the casing, a disk having a semispherical recess mounted on the head, a disk mounted on the shaft, and a plurality of spherical rollers mounted between the two disks.

10. The combination of a shaft, a disk formed in one piece, another disk placed around the shaft and formed in halves bolted together with abutting edges, said edges being rounded, and a plurality of spherical rollers interposed between the disks.

11. The combination of a shaft, a disk, another disk located around the shaft and formed in halves bolted together with abutting edges, said edges being rounded, and a plurality of spherical rollers interposed between the disks, the diameter of each roller being greater than its length.

12. The combination of a shaft having two shoulders, a hub mounted loosely on the shaft, a plurality of studs extending from the hub, a spherical roller mounted on each stud, a casing surrounding the hub and the rollers, a disk mounted on the shaft between the shoulders in contact with the rollers and arranged to rotate with the shaft by reason of contact with one of the shoulders, and a disk on the opposite side of the rollers in contact with the casing and arranged to remain stationary by virtue of said contact.

Signed at the city of New York in the county of New York and State of New York this 15th day of October A. D. 1908.

GUSTAF RENNERFELT.

Witnesses:
Z. ROSENFIELD,
A. GUNDUSHEIMER.